(12) United States Patent
Weber et al.

(10) Patent No.: US 6,583,259 B1
(45) Date of Patent: Jun. 24, 2003

(54) TWO-COMPONENT MATERIAL FOR CHEMICAL FIXING MEANS

(75) Inventors: Christian Weber, Emmendingen (DE); Joachim Schaetzle, Kenzingen (DE); Juergen Gruen, Boetzingen (DE); Andreas Kiefer, Vogtsburg (DE)

(73) Assignee: fischerwerke Artur Fischer GmbH & CO. KG, Waldachtal (DE)

( * ) Notice: Subject to any disclaimer, the term of this patent is extended or adjusted under 35 U.S.C. 154(b) by 0 days.

(21) Appl. No.: 09/806,669

(22) PCT Filed: Nov. 5, 1999

(86) PCT No.: PCT/EP99/08490

§ 371 (c)(1), (2), (4) Date: Apr. 3, 2001

(87) PCT Pub. No.: WO00/29498

PCT Pub. Date: May 25, 2000

(30) Foreign Application Priority Data

Nov. 16, 1998 (DE) .......................................... 198 52 720

(51) Int. Cl.$^7$ ................................................. C09J 4/00
(52) U.S. Cl. ..................... 528/219; 156/71; 206/219; 206/568; 528/112
(58) Field of Search ................ 206/568, 219; 528/88, 112, 219; 156/71

(56) References Cited

U.S. PATENT DOCUMENTS

| 3,477,990 | A | * | 11/1969 | Aaute et al. ................. 528/112 |
| 4,048,141 | A | * | 9/1977 | Doorakian et al. ......... 528/112 |
| 4,750,615 | A | * | 6/1988 | Käufeler ..................... 206/568 |
| 4,894,269 | A | * | 1/1990 | Kimura ...................... 206/568 |
| 5,256,723 | A |   | 10/1993 | Hense |

FOREIGN PATENT DOCUMENTS

| DE | 2202040 | * | 7/1973 | ................. 528/112 |
| DE | 35 14 031 A |   | 10/1986 | |
| DE | 41 21 832 C |   | 6/1992 | |

* cited by examiner

Primary Examiner—Geoffrey L. Knable
(74) Attorney, Agent, or Firm—Michael J. Striker

(57) ABSTRACT

The two-component composition for chemical fastenings consists of a first component and a second component separate from the first component. The first component contains a free-radical-curable synthetic resin, which is a mono-acrylate or monomethacrylate of an alkoxylated bisphenol having a viscosity of 100 to 5000 mPa·s at 23° C. The second component is a curing agent for the synthetic resin, such as dibenzoyl peroxide or methyl ethyl ketone peroxide. The first component may also include an accelerator. Good adhesion characteristics in wet concrete are provided by the adhesive composition because a monoacrylate and/or monomethacrylate of an alkoxylated, especially an ethoxylated or propyloxylated, bisphenol is used as the curable synthetic resin.

5 Claims, No Drawings

TWO-COMPONENT MATERIAL FOR CHEMICAL FIXING MEANS

BACKGROUND OF THE INVENTION

The present invention relates to fixing compositions and, more particularly, to two-component systems for chemical fixing.

The use of reactive resin compositions based on unsaturated polyester resins, vinyl ester resins, vinyl urethane resins or epoxy resins as adhesives and bonding agents for chemical fastening has long been known. They are two-component systems, one component comprising the reactive resin and the other component comprising the hardener. Other customary constituents such as fillers, accelerators, stabilisers and solvents, including reactive diluents, can be contained in either component.

A two-component composition of that kind is described in the publication DE 41 21 832 C1. That known composition consists of 2,2-bis[4-methacryloxyethoxy-phenyl]propane together with unsaturated polyester resin and/or vinyl ester resin and/or acrylic resin and/or vinyl urethane resin or a mixture thereof.

A composition of that kind has the advantage that it contains no styrene and, as a result, is suitable for many areas of application.

When carrying out fastening in a wet drillhole, however, reduced adhesion to the wall of the drillhole occurs, leading to a reduction in bonding strength.

SUMMARY OF THE INVENTION

The problem of the invention is to provide a bonding composition that, in a wet drillhole, has good adhesion to the wall of the drillhole and ensures high strength values.

It has been found that the problem is solved when a monoacrylate and/or monometh-acrylate of an alkoxylated bisphenol is used as the curable synthetic resin with especially good adhesion characteristics with respect to the wall of the drillhole being obtained when the synthetic resin comprises a compound of formula

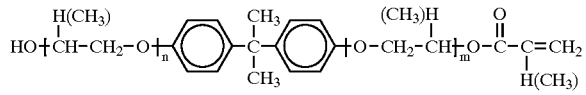

The preferred synthetic resins are monoacrylates that have a viscosity of from 100 to 5000, especially from 200 to 3500, mPa·s, measured without thixotropic agents and in the absence of fillers. The viscosity of the synthetic resin can be adjusted by means of the chain length of the alkoxy groups.

The resin component comprises a mono(meth)acrylate of an alkoxylated bisphenol, for example bisphenol A, bisphenol F or bisphenol S containing an alkoxide, for example ethylene oxide or propylene oxide.

The synthetic resin may contain up to 90% by weight of other curable resins such as polyesters, vinyl esters and vinyl urethane esters. The amount of comonomers in the synthetic resin should not exceed an amount of 60% by weight. As comonomers there may be present acrylates, such as trimethylolpropane tri-acrylate and -methacrylate, butanediol dimethacrylate, ethylene glycol dimethacrylate, polyethylene glycol dimeth-acrylate, neopentyl glycol dimethacrylate, pentaerythritol dimethacrylate, 2-hydroxypropyl methacrylate and acetoacetoxyethyl methacrylate.

If accelerators are required for peroxide curing, they are located together with the resin, that is to say separated from the hardener.

Suitable accelerators are aromatic amines, such as N,N-dimethylaniline, N,N-diethyl-aniline, toluidines and xylidines. The accelerators are present in the synthetic resin in amounts of from 0.5 to 5% by weight.

The synthetic resin may also comprise fillers. As reinforcing fillers for the bonding composition there are used, for example, quartz, glass, corundum, porcelain, earthenware, talcum, chalk and cement. The fillers are mixed into the resin component and/or the hardener in the form of sand, powder or structures of a specific shape, for example spheres. The fillers may be used in the form of fibres.

For example, dibenzoyl peroxide or methyl ethyl ketone peroxide, may be used as curing agent, in amounts of from 0.5 to 10, preferably 1 to 6, % by weight.

The bonding composition according to the invention has very good adhesion even to a wet substrate so that such anchorages have high failure loads with very low elongation at break even in the case of concrete that has been very thoroughly wetted.

The invention also includes a container for the two-components adhesive composition. The container may be a cartrige or a capsule having a plurality of chambers that are separate from each other. The synthetic resin is held in one chamber, while the curing agent is contained in another chamber.

Alternatively a tubular film container may be provided for the two-component adhesive composition. The tubular film container includes a plurality of tubular container compartments. Again the synthetic resin is held in one compartment, while the curing agents is contained in the other compartment.

EXAMPLES

Example 1

Composite anchor consisting of M12 glass cartridge and M12×160 mm anchor rod having a 90° roof blade Material quality: 10.9

Bore dia.: 14 mm

Anchoring depth: 110 mm

Resin Component 3.36 g diethoxylated bisphenol A monomethacrylate 0.21 g vinyl ester resin, ester number EN=245 mg KOH/g 0.50 g butanediol dimethacrylate 0.04 g dimethyl paratoluidine 9.20 g quartz sand (particle size 1.2–1.8 mm)

Hardener Component 0.42 g dibenzoyl peroxide (50% by weight in dicyclohexyl phthalate)

set in wet concrete of class B 25 curing time: 0.5 hour pull-out load (F) for a pull-out parameter of 0.5 mm ($F_{u0.5}$)

$F_{U0.5}$=65 kN $F_{max}$=72 kN

Example 2

Composite anchor consisting of M12 glass cartridge and M12×160 mm anchor rod having a 90° roof blade Material quality: 10.9

Bore dia.: 14 mm

Anchoring depth: 110 mm

Resin Component 1.39 g monomethacrylate as in Example 1

2.18 g vinyl ester resin as in Example 1

0.50 g butanediol dimethacrylate 0.04 g dimethyl paratoluidine 9.20 g quartz sand (particle size 1.2–1.8 mm)

Hardener Component 0.42 g dibenzoyl peroxide (50% by weight in dicyclohexyl phthalate)

set in wet concrete of class B 25 curing time: 0.5 hour $F_{U0.5}$=50 kN $F_{max}$=69 kN

Example 3

Composite anchor consisting of M12 glass cartridge and M12×160 mm anchor rod having a 90° roof blade Material quality: 10.9

Bore dia.: 14 mm

Anchoring depth: 110 mm

Resin Component 0.47 g monomethacrylate as in Example 1

3.10 g vinyl ester resin as in Example 1

0.50 g butanediol dimethacrylate 0.04 g dimethyl paratoluidine 9.2 g quartz sand (particle size 1.2–1.8 mm)

Hardener Component 0.42 g dibenzoyl peroxide (50% by weight in dicyclohexyl phthalate)

set in wet concrete of class B 25 curing time: 0.5 hour $F_{U0.5}$=48 kN $F_{max}$=61 kN

Comparison Example

Composite anchor consisting of M12 glass cartridge and M12×160 mm anchor rod having a 90° roof blade Material quality: 10.9

Bore dia.: 14 mm

Anchoring depth: 110 mm

Resin Component 3.57 g vinyl ester resin as in Example 1

0.50 g butanediol dimethacrylate 0.04 g dimethyl paratoluidine 9.2 g quartz sand (particle size 1.2–1.8 mm)

Hardener Component 0.42 g dibenzoyl peroxide (50% by weight in dicyclohexyl phthalate)

set in wet concrete of class B 25 curing time: 0.5 hour $F_{U0.5}$=38 kN $F_{max}$=56 kN

We claim:

1. A two-component adhesive composition for fastening, said adhesive composition comprising a first component which is a free-radical-curable synthetic resin; and a second component separate from said first component, said second component comprising a curing agent for the synthetic resin;

wherein said synthetic resin has a viscosity, at 23° C., of between 100 and 5000 mPa·s and comprises a compound of formula

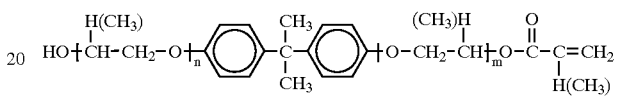

wherein m and n, independently of each other, are each a number from 1 to 5.

2. The two-component adhesive composition as defined in claim 1, wherein said synthetic resin includes from 0 to 90 percent by weight of at least one additional resin ingredient and said at least one additional resin ingredient is selected from the group consisting of unsaturated polyester resin, vinyl ester resin, epoxy acrylate resin and vinyl urethane resin.

3. The two-component adhesive composition as defined in claim 1, wherein said curing agent comprises dibenzoyl peroxide or methyl ethyl ketone peroxide.

4. The two-component adhesive composition as defined in claim 1, wherein said first component comprises an accelerator.

5. A two-component adhesive composition and container for said two-component adhesive composition, wherein said two-component adhesive composition comprises a first component which is a free-radical-curable synthetic resin, said synthetic resin having a viscosity, at 23° C., of between 100 and 5000 mPa·s and comprising at least one member selected from the group consisting of monoacrylates of alkoxylated bisphenols and monomethacrylates of alkoxylated bisphenols, said monoacrylates and monomethacrylates each having the formula:

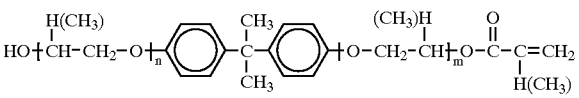

wherein m and n, independently of each other, are each a number from 1 to 5; and a second component separate from said first component, said second component comprising a curing agent for the synthetic resin; and said container is a cartridge, a capsule or a tubular film container, said first component and said second component being contained in different chambers or tubular compartments of said container.

* * * * *